(12) United States Patent
Ramseyer

(10) Patent No.: US 7,832,780 B1
(45) Date of Patent: Nov. 16, 2010

(54) PORTABLE KITCHEN APPARATUS

(76) Inventor: Timothy A. Ramseyer, P.O. Box 444, 30818 N. 213th Dr., Wittmann, AZ (US) 85361

(*) Notice: Subject to any disclaimer, the term of this patent is extended or adjusted under 35 U.S.C. 154(b) by 159 days.

(21) Appl. No.: 12/195,955

(22) Filed: Aug. 21, 2008

(51) Int. Cl.
*B60P 3/025* (2006.01)
*F24C 15/30* (2006.01)

(52) U.S. Cl. ............... 296/22; 296/1.07; 224/404; 126/268; 126/38; 126/25 R; 312/140.2; 108/44

(58) Field of Classification Search ............... 296/22, 296/156, 51, 37.6, 1.07; 224/402–404; 126/268, 126/9 R, 38, 37 B, 59, 25 R; 312/140.2, 312/258; 108/44
See application file for complete search history.

(56) References Cited

U.S. PATENT DOCUMENTS

| | | | |
|---|---|---|---|
| 2,889,051 A * | 6/1959 | Kramer | 211/74 |
| 3,406,999 A | 10/1968 | Kozicki | |
| 3,809,425 A | 5/1974 | Blaschke | |
| 3,817,190 A * | 6/1974 | Evangelista | 108/44 |
| 4,082,391 A * | 4/1978 | Turner | 312/314 |
| 4,089,554 A | 5/1978 | Myers | |
| 4,501,457 A | 2/1985 | Pond | |
| 4,518,189 A | 5/1985 | Belt | |
| 5,029,935 A * | 7/1991 | Dufrancatel | 296/156 |
| D376,578 S | 12/1996 | Redford | |
| 5,586,546 A | 12/1996 | Ashcraft et al. | |
| 5,649,734 A | 7/1997 | Speis | |
| 6,193,294 B1 * | 2/2001 | Disner et al. | 296/26.11 |
| 6,591,831 B2 * | 7/2003 | Reynolds | 126/33 |
| 6,641,190 B2 * | 11/2003 | Kirchhoff | 296/26.11 |
| 6,962,381 B2 * | 11/2005 | Warning | 296/1.07 |
| 7,464,978 B1 * | 12/2008 | Meeks | 296/37.6 |
| 2003/0075943 A1 * | 4/2003 | Kirchhoff | 296/26.11 |
| 2004/0140740 A1 * | 7/2004 | Gauss | 312/140.2 |
| 2008/0190977 A1 * | 8/2008 | Estabrook | 224/404 |

* cited by examiner

*Primary Examiner*—Jason S Morrow

(57) ABSTRACT

The present invention features a portable kitchen apparatus for attaching to a vehicle comprising a foldable countertop having a sink basin hole, a stove hole, a sink basin, a stove, and a flame protector. The portable kitchen apparatus may be used for outdoor cooking and/or cleaning while camping.

2 Claims, 3 Drawing Sheets

PORTABLE KITCHEN APPARATUS

FIELD OF THE INVENTION

The present invention is directed to a portable cooking/cleaning unit for use with a motor vehicle.

BACKGROUND OF THE INVENTION

The present invention features a portable kitchen apparatus for attaching to a vehicle. The portable kitchen apparatus of the present invention provides a countertop and cooking space to a user, and may eliminate the need to use a truck's tailgate as a countertop. The portable kitchen apparatus enables campers, tailgaters, and other such individuals to easily cook foods and wash utensils at outdoor locations.

More specifically, the present invention features a portable kitchen apparatus for attaching to a vehicle (e.g., a truck bed). The portable kitchen apparatus comprises a countertop having a sink basin hole, a stove hole, and a plurality of hinges, wherein the hinge is for folding the countertop. The portable kitchen apparatus further comprises a removable sink basin, a removable stove, and a removable flame protector, wherein the flame protector is removably attached to the countertop. A plurality of mounting straps are removably attached to the countertop, wherein a mounting strap hook for attaching to the vehicle is disposed on the mounting straps. The portable kitchen apparatus may be used for outdoor cooking and/or cleaning while camping, tailgating, picnicking, and/or engaging in other activities.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
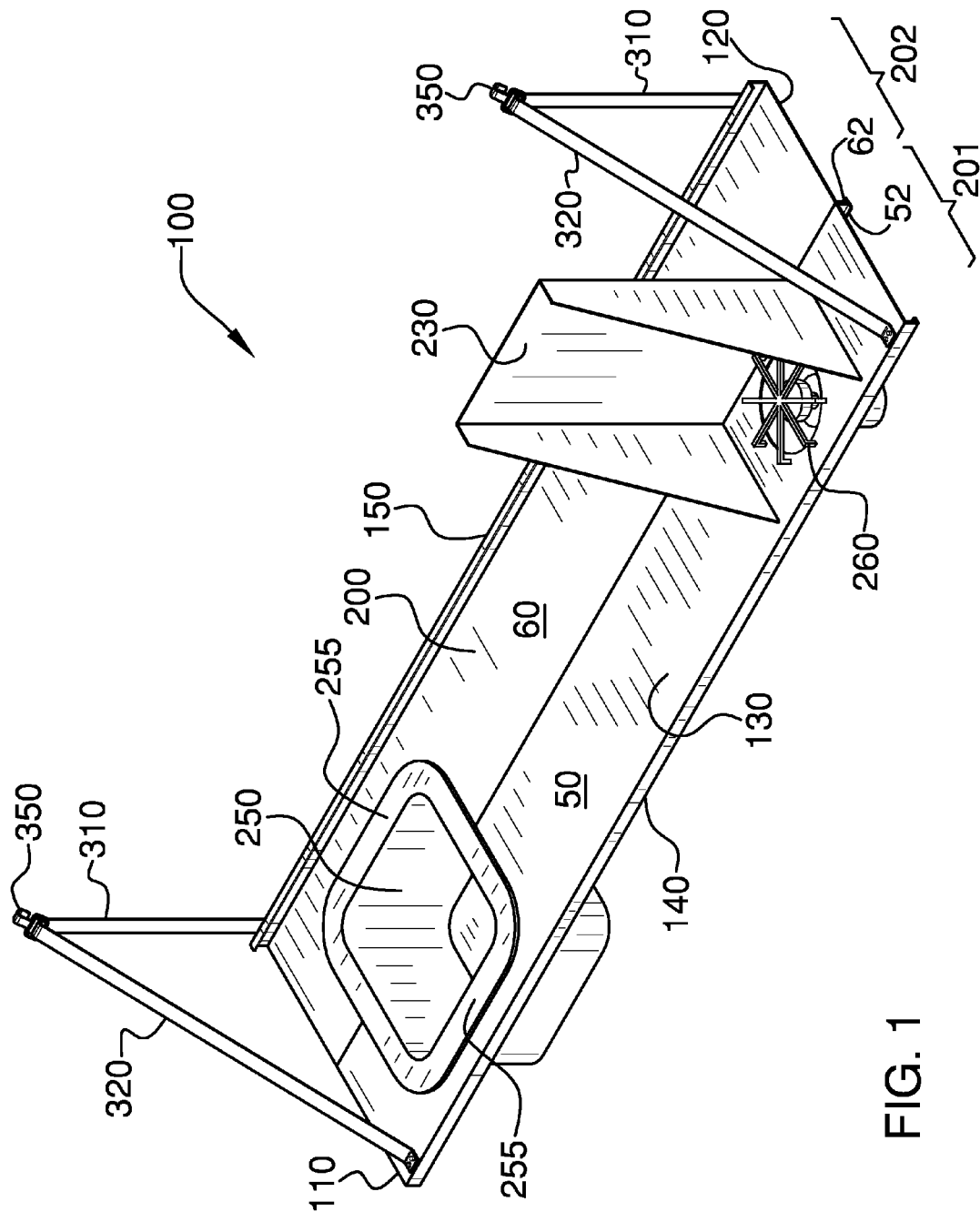
FIG. 1 is a perspective view of the portable kitchen apparatus of the present invention.
Figure 2:
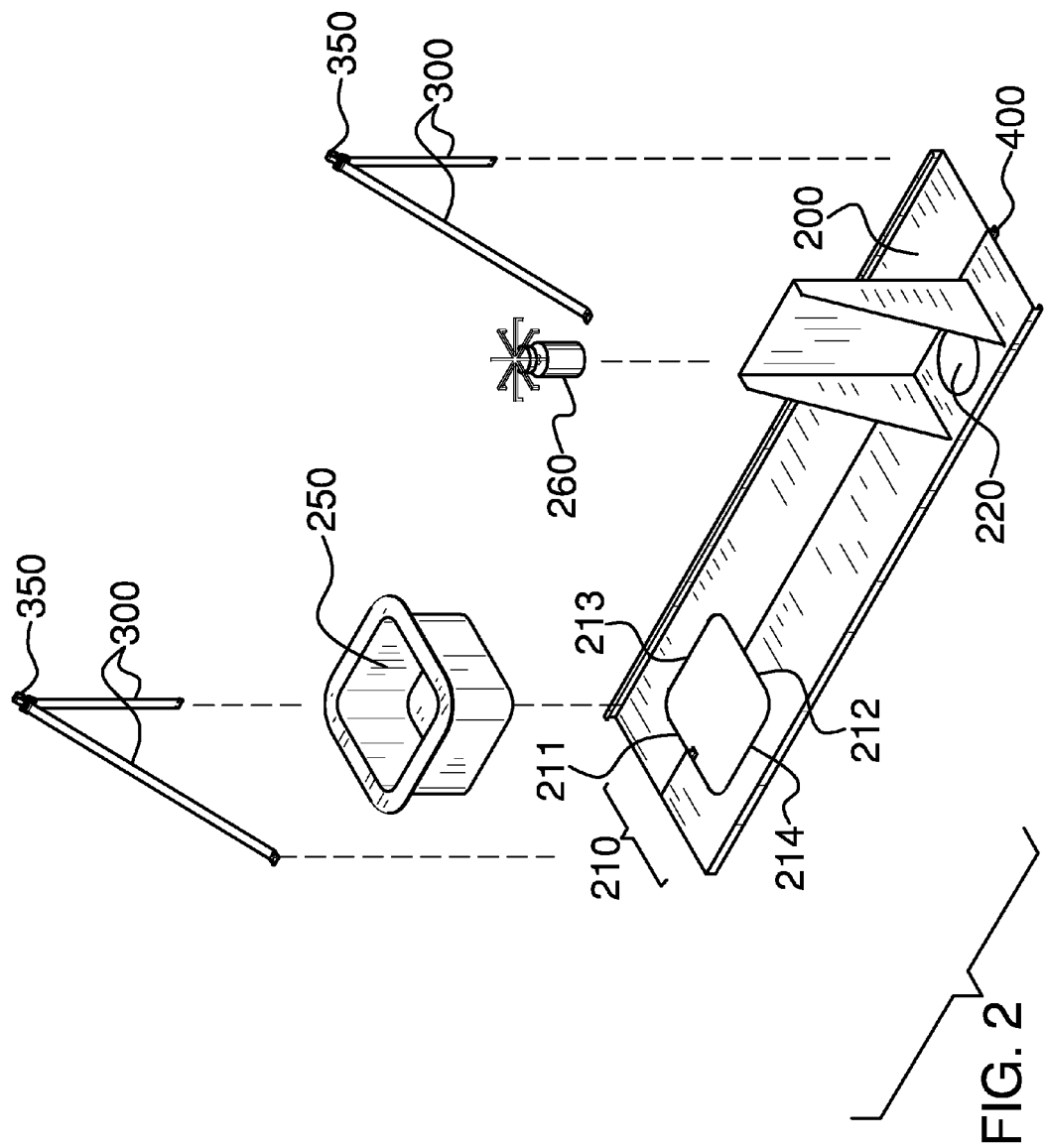
FIG. 2 is a perspective view of the portable kitchen apparatus illustrating a sink basin hole 210, a stove hole 220, a removable sink basin 250, a removable stove 260, and removable mounting straps 300.
Figure 3:
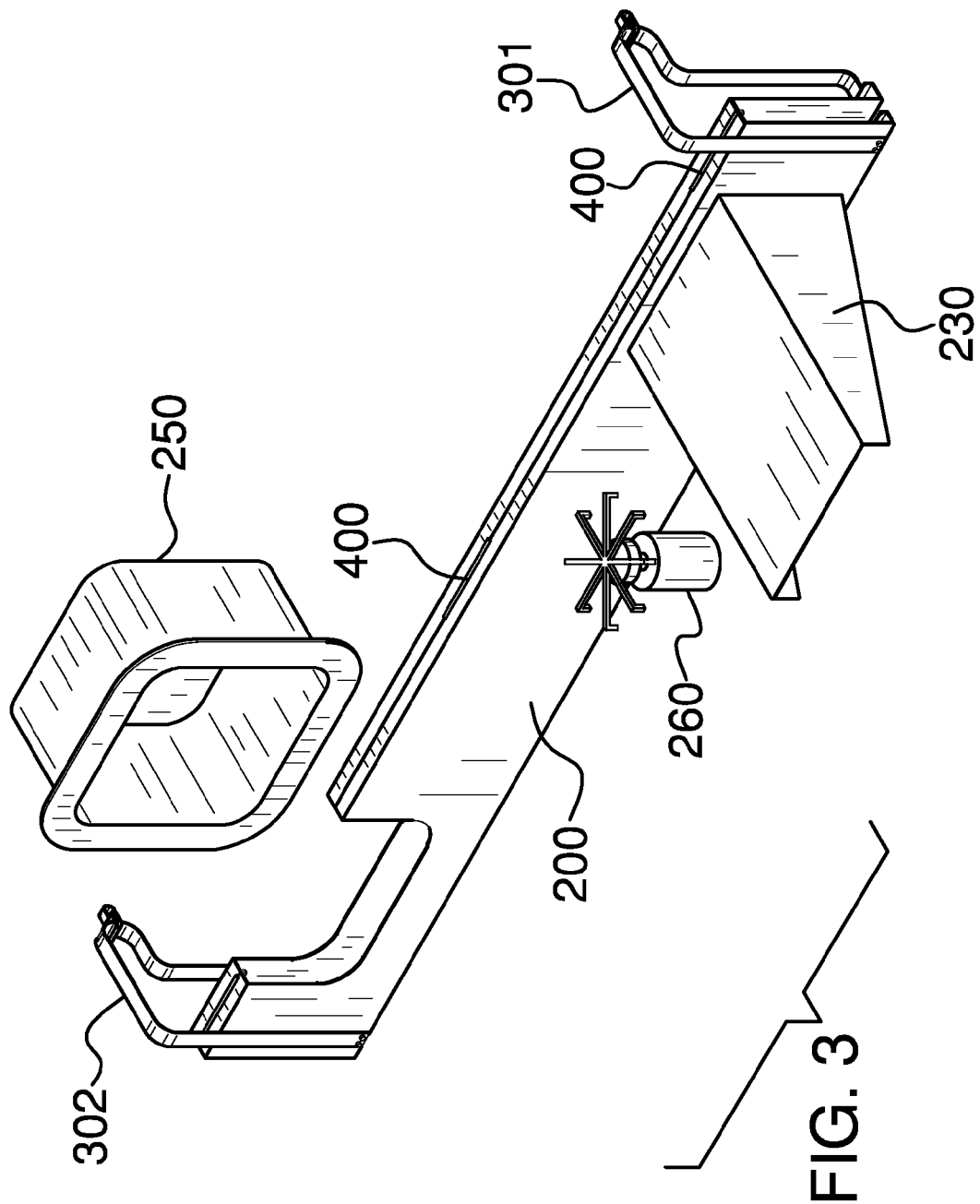
FIG. 3 is a perspective view of the portable kitchen apparatus of the present invention wherein the portable kitchen apparatus is folded using a plurality of hinges 400.

The following is a listing of numbers corresponding to a particular element refer to herein:
  50 first half of countertop
  52 first perpendicular bend
  60 second half of countertop
  62 second perpendicular bend
  100 portable kitchen apparatus
  110 second side edge of countertop
  120 first side edge of countertop
  130 bottom surface of countertop
  140 front edge of countertop
  150 back edge of countertop
  200 top surface of countertop
  201 first half of countertop
  202 second half of countertop
  210 sink basin hole
  211 left edge of sink basin hole
  212 right edge of sink basin hole
  213 back edge of sink basin hole
  214 front edge of sink basin hole
  220 stove hole
  230 flame protector
  250 sink basin
  265 sink basin lip
  260 stove
  301 first mounting strap
  302 second mounting strap
  310 vertical portion of mounting strap
  320 hypotenuse portion of mounting strap
  350 mounting strap hook
  400 hinge Referring now to FIGS. 1-3, the present invention features a portable kitchen apparatus for attaching to a vehicle having a side and a rim (e.g., a truck bed). The portable kitchen comprises a foldable countertop having a top surface, a bottom surface, a front edge, a back edge, a first side edge, a second side edge, a first half, a second half, a sink basin hole disposed in the countertop, and a stove hole disposed in the countertop. The countertop is foldable from an open position to a closed position via a plurality of hinges that are disposed at where the first half meets the second half and rotatably connecting the first half to the second half.

In some embodiments, the edge of the first half has a perpendicular bend 52, and the second half also has a perpendicular bend 62. When the countertop is in its open position, the two perpendicular bends flush to lock the first half and the second half in a horizontal/flat position.

The portable kitchen apparatus further comprises a first mounting strap having a first end, a second end, and a middle. The first end of the first mounting strap is attached to the back edge of the countertop near the first side edge and the second end of the first mounting strap is attached to the front edge of the countertop near the first side edge. A mounting strap hook for removably attaching the first mounting strap to the rim of the vehicle is disposed in the middle of the first mounting strap, separating the first mounting strap into a vertical portion and a hypotenuse portion.

The portable kitchen apparatus further comprises a second mounting strap having a first end, a second end, and a middle. The first end of the second mounting strap is attached to the back edge of the countertop near the second side edge and the second end of the mounting strap is attached to the front edge of the countertop near the second side edge. A mounting strap hook for removably attaching the second mounting strap to the rim of the vehicle is disposed in the middle of the second mounting strap, separating the second mounting strap into a vertical portion and a hypotenuse portion.

In some embodiments, the portable kitchen apparatus comprises a removable sink basin for inserting into the sink basin hole and/or a removable stove for inserting into the stove hole, and/or a removable flame protector for removably attaching to the countertop near the stove hole via an attachment means. In some embodiments, an attachment means includes a snap mechanism, a hook-and-loop fastener mechanism, a hook mechanism, a clip mechanism, the like, or a combination thereof.

In some embodiments, the countertop is in a closed position. In some embodiments, when the countertop is in a closed position, the first half of the countertop is folded over the second half of the countertop via the hinges.

In some embodiments, the countertop is in an open position. In some embodiments, when the countertop is in an open position, the first half of the countertop is opened via the hinges to create a planar surface with the second half of the countertop and the mounting strap hooks of both the first mounting strap and the second mounting strap are attached to the rim of the vehicle. Attaching the first mounting strap and the second mounting strap to the rim of the vehicle allows the countertop to be attached to the side of the vehicle wherein the back edge of the countertop and the vertical portion of both the first mounting strap and the second mounting strap touch the side of the vehicle, and the hypotenuse pardon of both the first mounting strap and the second mounting strap hold the countertop in a horizontal position with respect to the vehicle.

The portable kitchen apparatus may be used for outdoor cooking and/or cleaning while camping, tailgating, picnicking, and/or engaging in other activities, As used herein, the term "about" refers to plus or minus 10% of the referenced number. For example, an embodiment wherein the stove hole is about 10 inches in diameter includes a stove hole that is between 9 inches and 11 inches in diameter.

In some embodiments, the vertical portion of the first mounting strap and/or the second mounting strap is about 40 inches tall as measured from the first end of the mounting strap to the mounting strap hook. In some embodiments, the vertical portion of the first mounting strap and/or the second mounting strap is between about 10 inches to 20 inches tall as measured from the first end of the mounting strap to the mounting strap hook. In some embodiments, the vertical portion of the first mounting strap and/or the second mounting strap is between about 20 inches to 30 inches tall as measured from first end of the mounting strap to the mounting strap hook. In some embodiments, the vertical portion of the first mounting strap and/or the second mounting strap is between about 30 inches to 40 inches tall as measured from first end of the mounting strap to the mounting strap hook. In some embodiments, the vertical portion of the first mounting strap and/or the second mounting strap is between about 40 inches to 50 inches tall as measured from first end of the mounting strap to the mounting strap hook.

In some embodiments, the portable kitchen apparatus is about 6 feet long as measured from the first side edge of the countertop to the second side edge of the countertop. In some embodiments, the portable kitchen apparatus is between about 2 feet to 4 feet long as measured from the first side edge of the countertop to the second side edge of the countertop. In some embodiments, the portable kitchen apparatus is between about 4 feet to 6 feet long as measured from the first side edge of the countertop to the second side edge of the countertop. In some embodiments, the portable kitchen apparatus is between about 6 feet to 8 feet long as measured from first side edge of the countertop to the second side edge of the countertop.

In some embodiments, the portable kitchen apparatus is about 20 inches wide as measured from the back edge of the countertop to the front edge of the countertop. In some embodiments, the portable kitchen apparatus is between about 10 inches to 20 inches wide as measured from the back edge of the countertop to the front edge of the countertop. In some embodiments, the portable kitchen apparatus is between about 20 inches to 30 inches wide as measured from the back edge of the countertop to the front edge of the countertop. In some embodiments, the portable kitchen apparatus is between about 30 inches to 40 inches wide as measured from the back edge of the countertop to the front edge of the countertop.

In some embodiments, the sink basin hole is about 13:5 inches long as measured from the left edge of the sink basin hole to the right edge of the sink basin hole. In some embodiments, the sink basin hole is between about 10 inches to 15 inches long as measured from the left edge of the sink basin hole to the right edge of the sink basin hole. In some embodiments, the sink basin hole is between about 15 inches to 20 inches long as measured from the left edge of the sink basin hole to the right edge of the sink basin hole. In some embodiments, the sink basin hole is between about 20 inches to 25 inches long as measured from the left edge of the sink basin hole to the right edge of the sink basin hole.

In some embodiments, the sink basin hole is about 11.25 inches wide as measured from the back edge of the sink basin hole to the front edge of the sink basin hole. In some embodiments, the sink basin hole is between about 8 inches to 10 inches wide as measured from the back edge of the sink basin hole to the front edge of the sink basin hole. In some embodiments, the sink basin hole is between about 10 inches to 12 inches wide as measured from the back edge of the sink basin hole to the front edge of the sink basin hole. In some embodiments, the sink basin hole is between about 12 inches to 14 inches wide as measured from the back edge of the sink basin hole to the front edge of the sink basin hole.

In some embodiments, the stove hole is about 6 inches in diameter. In some embodiments, the stove hole is between about 3 inches to 6 inches in diameter. In some embodiments, the stove hole is between about 6 inches to 9 inches in diameter. In some embodiments, the stove hole is between about 9 inches to 12 inches in diameter.

In some embodiments, the stove is connected to a propane tank.

In some embodiments, the countertop is constructed from a material including a metal (e.g., aluminum, steel), a plastic, the like; or a combination thereof. in some embodiments, the countertop is covered with a material including a plastic, a lightweight plastic, a plastic laminate, the like, or a combination thereof. In some embodiments, the countertop is partially covered with a material including a plastic, a lightweight plastic, a plastic laminate, the like, or a combination thereof.

In some embodiments, the removable sink basin is constructed from a material including a plastic. In some embodiments, the sink basin comprises a lip, wherein the lip is for securing the sink basin in the sink basin hole.

In some embodiments, the back edge of the portable kitchen apparatus is coated with a protective material such as a rubber, a foam, a cloth, the like, or a combination thereof. In some embodiments, the protective material may prevent the portable kitchen apparatus from scratching the vehicle to which it is attached.

In some embodiments, the mounting strap hooks are coated with a protective material such as a rubber, a foam, a cloth, the like, or a combination thereof. In some embodiments, the protective material may prevent the mounting strap hooks from scratching the vehicle to which they are attached.

In some embodiments, the mounting straps are removable. In some embodiments, the mounting straps are permanently attached to the portable kitchen apparatus.

In some embodiments, the portable kitchen apparatus is equipped for running water. For example, in some embodiments, the portable kitchen apparatus comprises a faucet and/or spigot assembly. In some embodiments, the faucet and/or spigot assembly may be attached to a water supply.

In some embodiments, the portable kitchen apparatus further comprises a lighting mechanism (e.g., a light bulb, a plurality of light bulbs). In some embodiments, the lighting mechanism may be powered by a battery.

The following the disclosures of the following U.S. patents are incorporated in their entirety by reference herein: U.S. Pat. No. 3,406,999; U.S. Pat. No. 4,518,189; U.S. Pat. No. 4,501,457; U.S. Pat. No. 3,809,425; U.S. Pat. No. 5,586,546; U.S. Pat. Nos. 6,649,734; 4,089,554.

Example 1

Use of the Portable Kitchen Apparatus of the Present Invention

The following example describes the use of the portable kitchen apparatus while a user is camping. First, the user unfolds the countertop into the open position and attaches the mounting straps to his truck bed using the mounting strap hooks. Next, he attaches the flame protector to the countertop, inserts the removable sink basin in the sink basin hole, inserts the removable stove in the stove hole, and attaches a propane tank to the stove. The user then begins cooking his meal on the stove. After the user finishes cooking and eating, he pours about a gallon of water into the sink basin and washes his dishes and utensils in the sink basin.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A portable kitchen apparatus comprising:
   (a) a foldable countertop having a top surface, a bottom surface, a front edge, a back edge, a first side edge, a second side edge, a first half, a second half, a sink basin hole disposed in the countertop, and a stove hole disposed in the countertop; wherein the countertop is foldable from an open position to a closed position via a plurality of hinges disposed at where the first half meets with the second half and rotatably connecting the first half to the second half;
   (b) a first mounting strap having a first end, a second end, and a middle; wherein the first end of the first mounting strap is attached to the back edge of the countertop near the first side edge and the second end of the first mounting strap is attached to the front edge of the countertop near the first side edge; wherein a mounting strap hook for removably attaching the first mounting strap to a rim of a vehicle is disposed in the middle of the first mounting strap, separating the first mounting strap into a vertical portion and a hypotenuse portion;
   (c) a second mounting strap having a first end, a second end, and a middle; wherein the first end of the second mounting strap is attached to the back edge of the countertop near the second side edge and the second end of the second mounting strap is attached to the front edge of the countertop near the second side edge; wherein a mounting strap hook for removably attaching the second mounting strap to a rim of a vehicle is disposed in the middle of the second mounting strap, separating the second mounting strap into a vertical portion and a hypotenuse portion;
   (d) a removable sink basin for inserting into the sink basin hole disposed in the countertop;
   (e) a removable stove for inserting into the stove hole disposed in the countertop; and
   (f) a removable flame protector removably attached to the countertop near the stove hole via an attachment means; wherein when the countertop is in a closed position, the first half of the countertop is folded over the second half of the countertop via the hinges; wherein when the countertop is in an open position, the first half of the countertop is opened via the hinges to create a planar surface with the second half of the countertop, the mounting strap hooks of both the first mounting strap and the second mounting strap are attached to a rim of a vehicle, wherein when the first mounting strap and second mounting strap are attached to said vehicle the vertical portion of both the first mounting strap and the second mounting strap touch the vehicle and the hypotenuse portion of both the first mounting strap and the second mounting strap hold the countertop in a horizontal position with respect to said vehicle.

2. The portable kitchen apparatus of claim 1, wherein the countertop is constructed from a material comprising a metal, a plastic, or a combination thereof.

\* \* \* \* \*